(12) United States Patent
Satoh et al.

(10) Patent No.: US 9,992,235 B2
(45) Date of Patent: Jun. 5, 2018

(54) INFORMATION PROCESSING SYSTEM AND USER AUTHENTICATION METHOD

(71) Applicants: Mitsuru Satoh, Tokyo (JP); Nobuhiro Morita, Tokyo (JP); Tomoyuki Nozawa, Kanagawa (JP); Yoshihiro Ogura, Kanagawa (JP)

(72) Inventors: Mitsuru Satoh, Tokyo (JP); Nobuhiro Morita, Tokyo (JP); Tomoyuki Nozawa, Kanagawa (JP); Yoshihiro Ogura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 232 days.

(21) Appl. No.: 15/133,618

(22) Filed: Apr. 20, 2016

(65) Prior Publication Data
US 2016/0337335 A1   Nov. 17, 2016

(30) Foreign Application Priority Data

May 11, 2015   (JP) ................... 2015-096200

(51) Int. Cl.
*H04L 29/06* (2006.01)
(52) U.S. Cl.
CPC ........ *H04L 63/205* (2013.01); *H04L 63/0853* (2013.01)
(58) Field of Classification Search
CPC ........ G06F 21/123; G06F 21/34; G06F 21/77; H04W 12/06
USPC ................... 713/150–155; 726/2–7
See application file for complete search history.

(56) References Cited

U.S. PATENT DOCUMENTS

| 9,679,166 B2 * | 6/2017 | Yasutomi ............... G06F 21/86 |
| 2010/0205449 A1 * | 8/2010 | Eun ...................... G06Q 20/341 713/185 |
| 2011/0181903 A1 * | 7/2011 | Katsuyama .......... H04N 1/0035 358/1.14 |
| 2013/0235418 A1 * | 9/2013 | Tanaka ............... H04N 1/00228 358/1.15 |
| 2014/0076967 A1 * | 3/2014 | Pushkin ............. G06Q 20/3272 235/380 |

FOREIGN PATENT DOCUMENTS

JP   2010-186328   8/2010

OTHER PUBLICATIONS

Yong Wang, Mobile Payment Security, Mar. 2016, IEEE, vol. 10, pp. 1-5. (Year: 2016).*

* cited by examiner

*Primary Examiner* — Carl G Colin
*Assistant Examiner* — Viral S Lakhia
(74) *Attorney, Agent, or Firm* — Cooper & Dunham LLP

(57) ABSTRACT

An information processing system includes at least one information processing terminal and a first information processing apparatus. When an instruction for selecting a user authentication mode, which is received, from a user, by a user interface of the information processing terminal, selects a second user authentication mode, circuitry of the first information processing apparatus determines whether a sum of charges for services used by the user while logging in the information processing terminal via the second user authentication mode after a most recent login via a first user authentication mode exceeds a predetermined amount, and generates an authentication result indicating that the user is not the authenticated user.

11 Claims, 15 Drawing Sheets

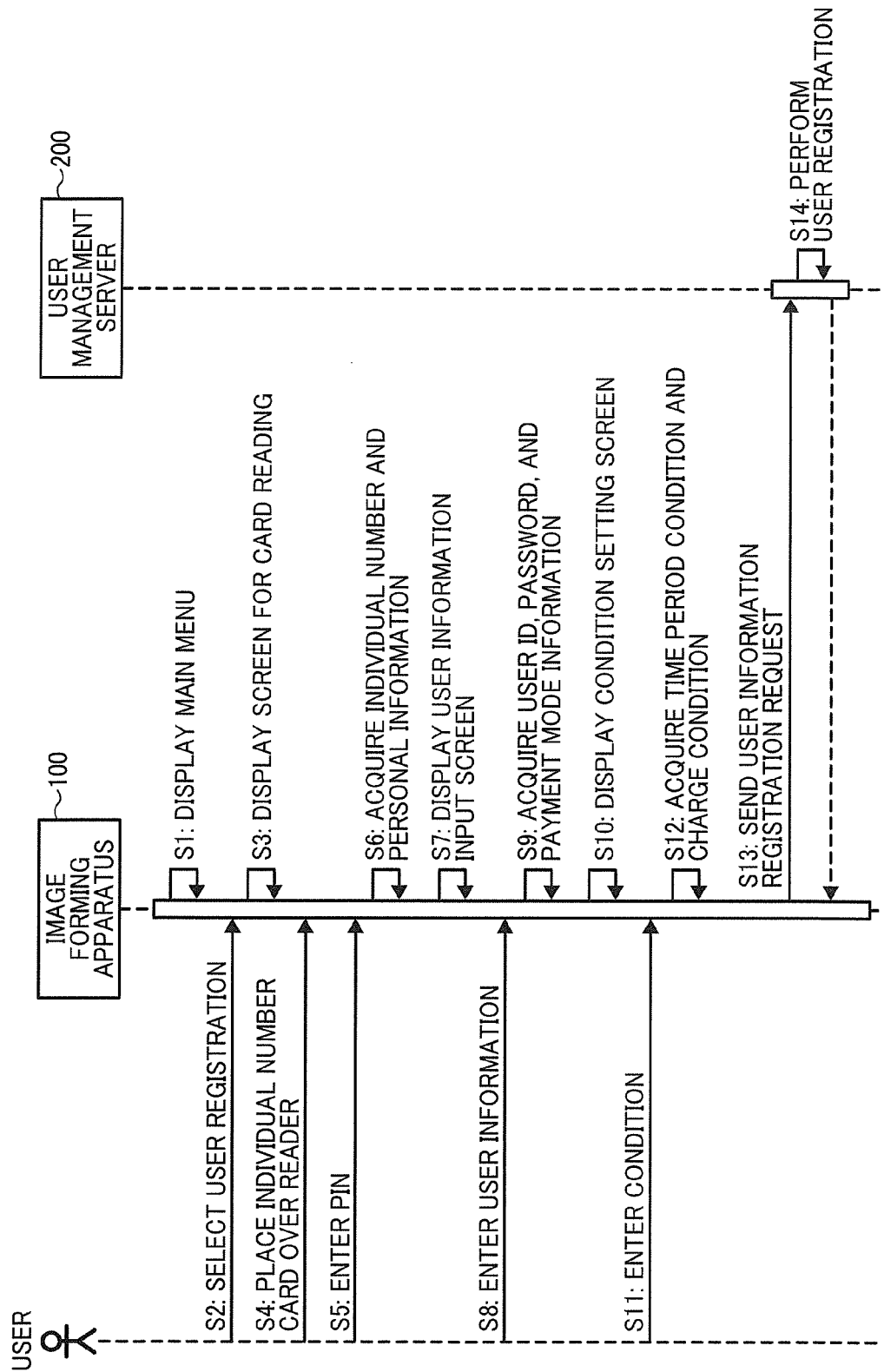

FIG. 6

| INDIVIDUAL NUMBER 501 | USER ID 502 | PASS-WORD 503 | NAME 504 | SEX 505 | ADDRESS 506 | BIRTH DATE 507 | PAYMENT MODE INFORMATION 508 | TIME PERIOD CONDITION 509 | CHARGE CONDITION 510 |
|---|---|---|---|---|---|---|---|---|---|
| 1234-5678-9012 | user001 | ***** | TAROH RICOH | MALE | XXX, YYY OHTA-KU, TOKYO | 01/03/1964 | ********** | 30 DAYS | 10,000 JPY |
| 2345-6789-0123 | user002 | ***** | HANAKO KANNON | FEMALE | ZZZ, XXX SUGINAMI-KU, TOKYO | 25/12/1971 | ********** | 15 DAYS | 5,000 JPY |
| ... | ... | ... | ... | ... | ... | ... | ... | ... | ... |

500

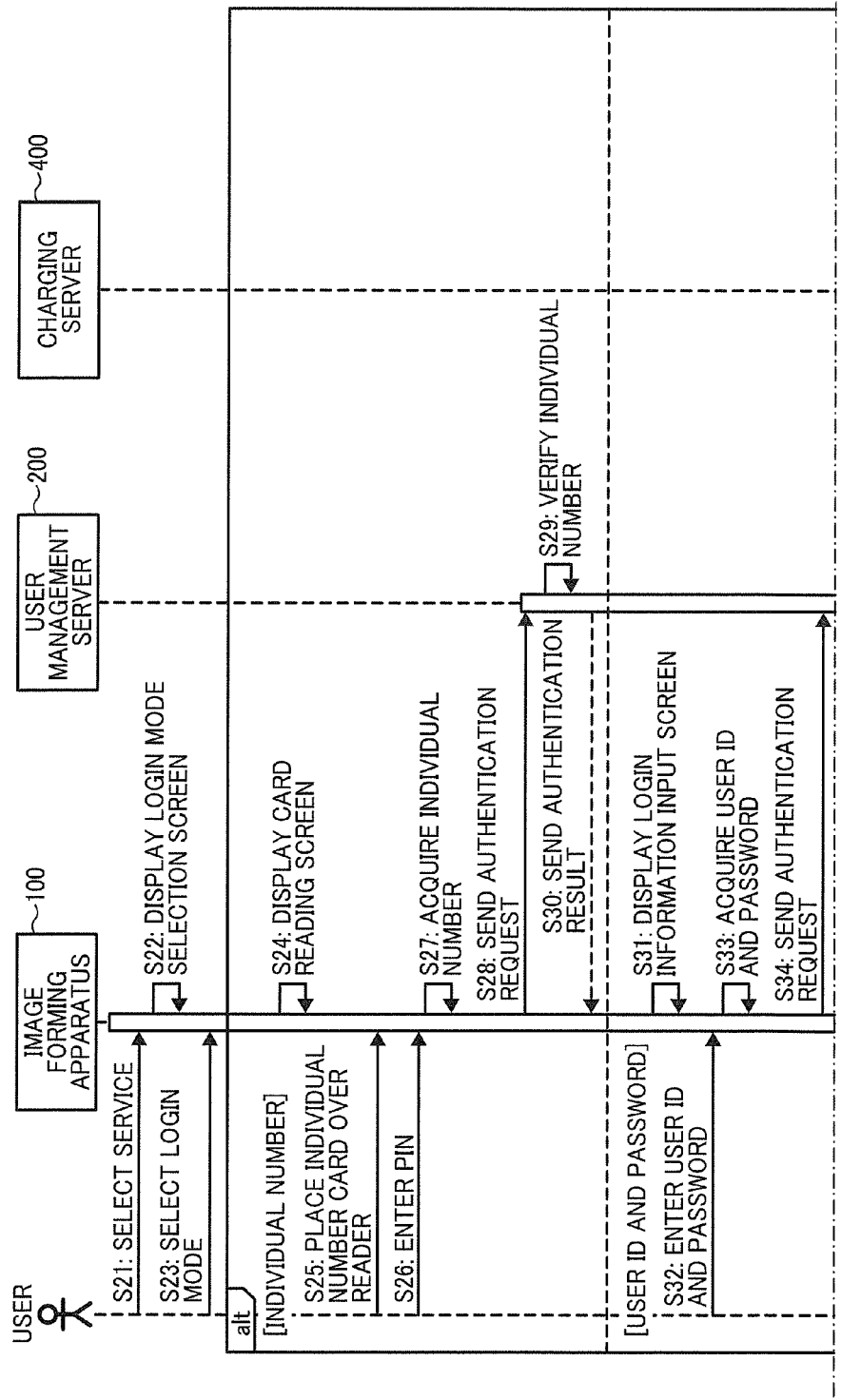

FIG. 9A

| LOGIN DATE AND TIME | USER AUTHENTICATION MODE |
|---|---|
| 2015/01/01/11:00 | INDIVIDUAL NUMBER CARD |
| ... | ... |
| 2015/02/01/12:00 | INDIVIDUAL NUMBER CARD |
| ... | ... |
| 2015/03/01/21:00 | INDIVIDUAL NUMBER CARD |
| 2015/03/05/13:00 | USER ID AND PASSWORD |
| 2015/03/10/09:00 | USER ID AND PASSWORD |
| 2015/03/15/15:00 | USER ID AND PASSWORD |
| 2015/03/20/14:00 | USER ID AND PASSWORD |
| 2015/03/25/16:00 | USER ID AND PASSWORD |
| 2015/03/28/13:00 | USER ID AND PASSWORD |

FIG. 9B

| LOGIN DATE AND TIME | CHARGED AMOUNT (JPY) |
|---|---|
| 2015/01/01/11:00 | 800 |
| ... | ... |
| 2015/02/01/12:00 | 1500 |
| ... | ... |
| 2015/03/01/21:00 | 1200 |
| 2015/03/05/13:00 | 1600 |
| 2015/03/10/09:00 | 1900 |
| 2015/03/15/15:00 | 1700 |
| 2015/03/20/14:00 | 1500 |
| 2015/03/25/16:00 | 1800 |
| 2015/03/28/13:00 | 1600 |

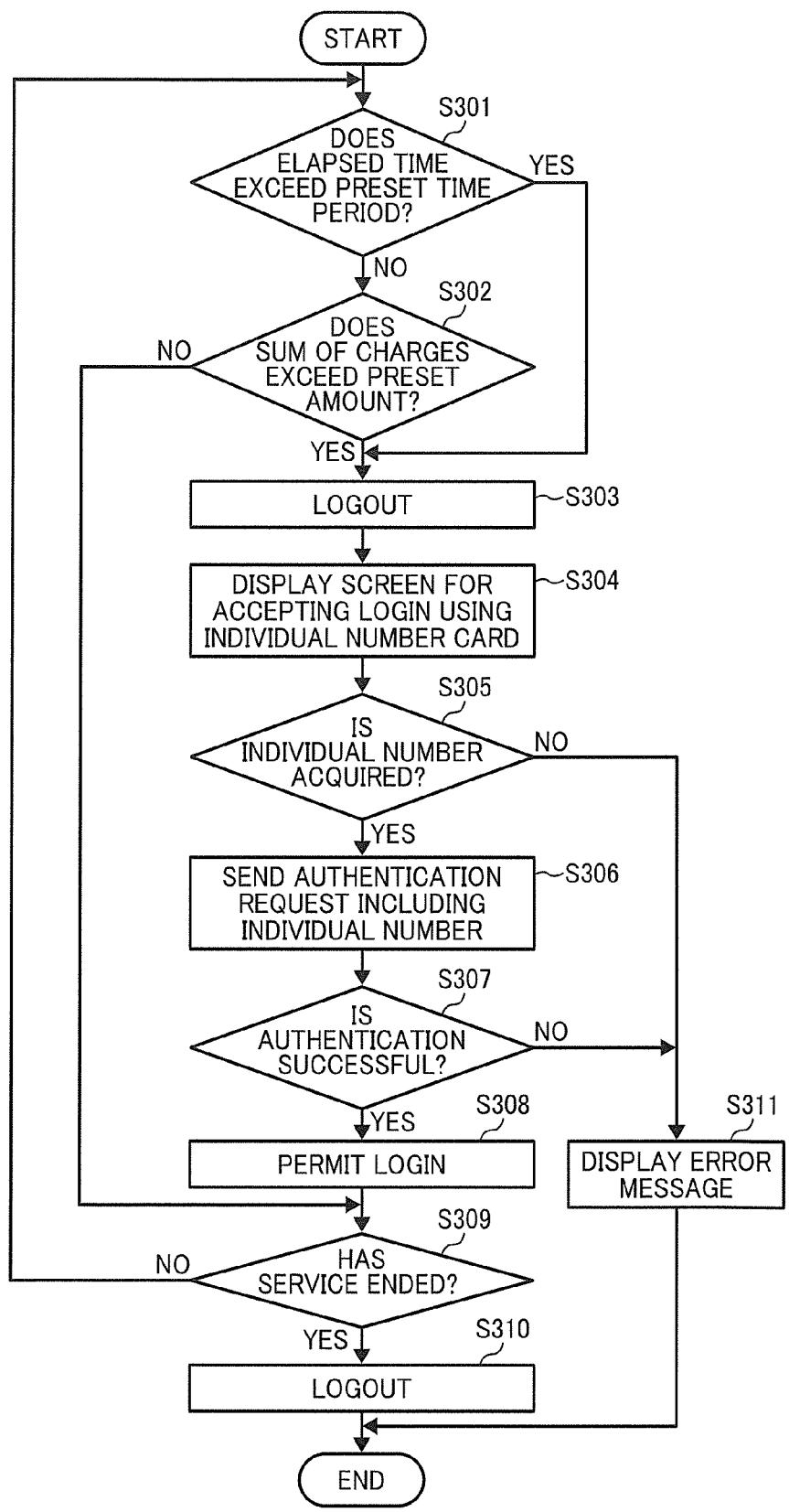

INFORMATION PROCESSING SYSTEM AND USER AUTHENTICATION METHOD

CROSS-REFERENCE TO RELATED APPLICATIONS

This patent application is based on and claims priority pursuant to 35 U.S.C. § 119(a) to Japanese Patent Application No. 2015-096200, filed on May 11, 2015, in the Japan Patent Office, the entire disclosure of which is hereby incorporated by reference herein.

BACKGROUND

Technical Field

The present disclosure relates to an information processing system and a user authentication method.

Description of the Related Art

Image forming apparatuses used in an office are often capable of performing user authentication based on integrated circuit (IC) cards carried by different users. For example, the image forming apparatus manages use authority specific to each user based on information stored in the IC card of each user to record the user's operation history in the IC card of each user.

SUMMARY

An information processing system includes at least one information processing terminal and a first information processing apparatus connected to the at least one information processing terminal via a network. The information processing terminal includes a user interface and circuitry. The user interface receives, from a user, an instruction for selecting a user authentication mode from among at least a first user authentication mode and a second user authentication mode. The first user authentication mode uses individual authentication information stored in an IC card as user authentication information, and the second user authentication mode uses a user ID and a password input from the user as the user authentication information. The circuitry of the information processing terminal, in response to the instruction from the user for selecting the first user authentication mode, acquires the individual authentication information from the IC card, and sends a user authentication request including the individual authentication information acquired from the IC card to the first information processing apparatus. The circuitry of the information processing terminal, in response to the instruction from the user for selecting the second user authentication mode, acquires the user ID and the password input from the user, and sends the user authentication request including the user ID and the password to the first information processing apparatus. The circuitry of the information processing terminal sends, to the first information processing apparatus, a login history recording request when the user is an authenticated user who is permitted to log in the information processing terminal, the login history recording request including information indicating the selected user authentication mode selected by the authenticated user and login date and time of the authenticated user. The first information processing apparatus includes a memory and circuitry. The memory stores a login history that associates the selected user authentication mode with the login date and time of the authenticated user, which are included in the login history recording request received from the information processing terminal. The circuitry of the first information processing apparatus authenticates the user based on the authentication information included in the user authentication request received from the information processing terminal. In the information processing system, when the instruction for selecting selects the second user authentication mode, the circuitry of the first information processing apparatus is further configured to determine whether a sum of charges for services used by the user while logging in the information processing terminal via the second user authentication mode after a most recent login via the first user authentication mode exceeds a predetermined amount, and generate an authentication result indicating that the user is not the authenticated user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a sequence diagram illustrating an operation of registering a user according to an embodiment of the present invention;

FIG. 6 is a view illustrating a user information management table according to an exemplary embodiment of the present invention;

FIGS. 7A and 7B is a sequence diagram illustrating an operation of authenticating a user to login the image forming apparatus of FIG. 2 to use a service that the network printing system of FIG. 1 provides;

FIG. 9A is a view illustrating a login history list according to an exemplary embodiment of the present invention;

FIG. 9B is a view illustrating a charging history list according to an exemplary embodiment of the present invention;

FIG. 13 is a flowchart illustrating an operation executed by the login processing unit of the image forming apparatus of FIG. 2;

Figure 1:
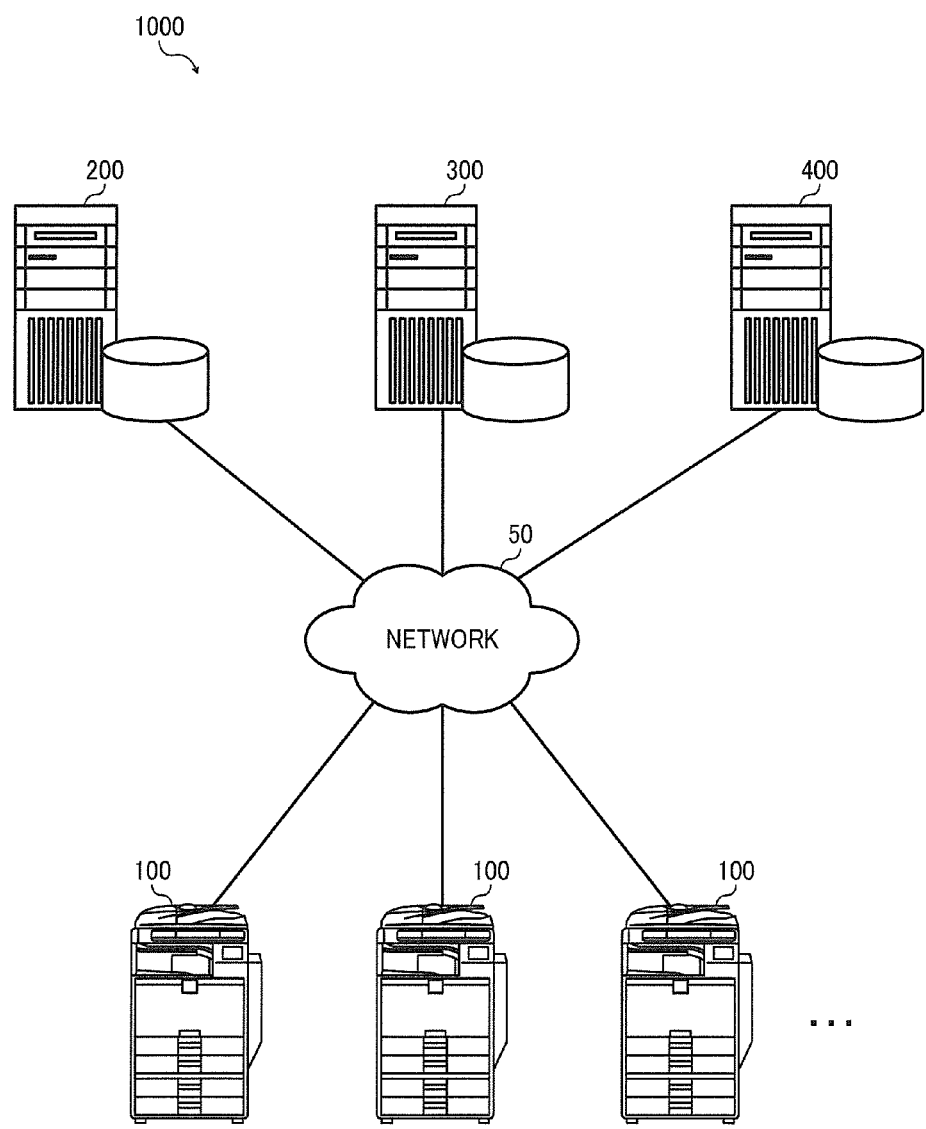
FIG. 1 is a schematic view illustrating a network printing system according to an exemplary embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Hereinafter, a description is given of an information processing system that performs a user authentication based on an existing integrated circuit (IC) card that a user possesses. In the following embodiments, the existing IC card means a recording medium storing therein individual identification information that is used for identifying a user. A typical example of such recording medium is a variety of IC cards issued by administrative offices. Examples of such IC cards may include the Basic Resident Registration card, an IC driver's license, and the Individual Number card. The Individual Number card is a card bearing the Individual Number, which is a 12-digit ID number that is issued to all citizens and residents of Japan. It is like the Social Security card of the United States, and contains an IC chip storing the bearer's personal information such as his/her Individual Number, name, address, date of birth, and sex.

Hereinafter, a description is given of an embodiment where the Individual Number card is used as the existing IC card, and an image forming apparatus is used as an information processing terminal that requires a user authentication with the Individual Number card in a login operation. However, the present invention is not limited to the following exemplary embodiment. In the drawings for describing the following embodiment, the same reference numbers are allocated to elements (members or components) having the same function or shape and redundant descriptions thereof are omitted below.

FIG. 1 is a schematic view illustrating a network printing system 1000 according to an exemplary embodiment of the present invention. The network printing system 1000 provides a network printing service, and includes at least one image forming apparatus 100, a user management server 200, a file server 300, and a charging server 400. The image forming apparatus 100, the user management server 200, the file server 300, and the charging server 400 are communicably connected to one another via a network 50, which may be implemented by, for example, a wide area network (WAN) such as the Internet or a virtual private network (VPN).

The image forming apparatus 100 according to this exemplary embodiment is an information processing terminal, which is network-capable, including a printing engine supporting an electrophotographic system or an inkjet printing system. The image forming apparatus 100 may be implemented, for example, by a multifunction peripheral (MFP). The image forming apparatus 100 according to this exemplary embodiment is supposed to be provided, for example, in a convenience store, to be made available in public.

The user management server 200 according to this exemplary embodiment is an information processing apparatus to authenticate a user who uses the image forming apparatus 100. In addition, the user management server 200 manages user information.

The file server 300 according to this exemplary embodiment stores an image file to be printed. The file server 300 is an information processing apparatus to store an image file that is uploaded from the image forming apparatus 100 or an image file that is uploaded from another computer connected to the network 50, and to provide the image file to the image forming apparatus 100 in response to receiving a request from the image forming apparatus 100.

The charging server 400 according to this exemplary embodiment is an information processing apparatus to execute charging operation for a service provided by the image forming apparatus 100. The image forming apparatus 100 according to this exemplary embodiment supports a cashless payment system. According to the cashless payment system, a payment of charges is settled at some future date in a payment mode that is registered by a user in advance, such as a credit card.

Figure 2:
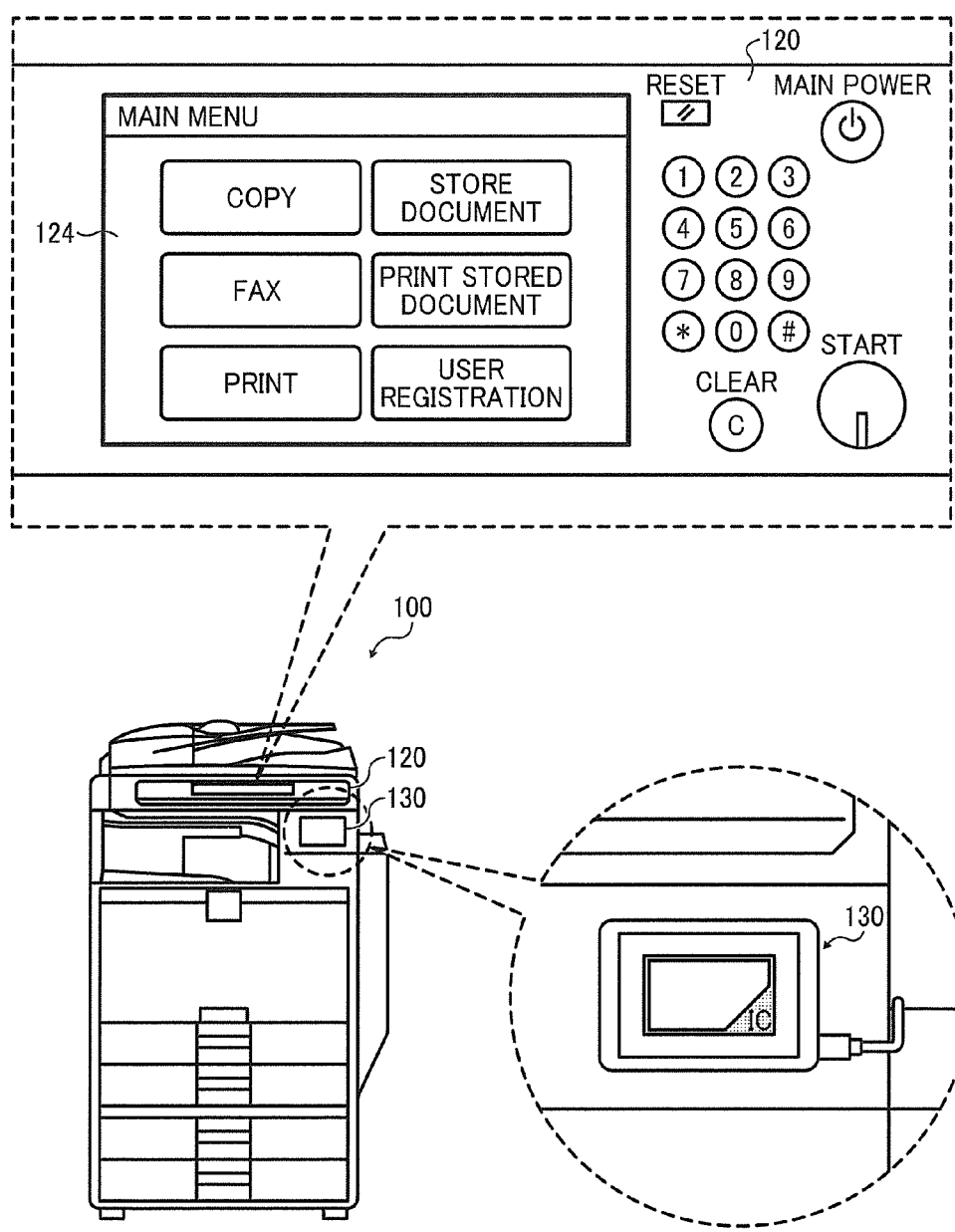
FIG. 2 is an external view of an image forming apparatus included in the network printing system of FIG. 1.

FIG. 2 illustrates an external view of the image forming apparatus 100. As illustrated in FIG. 2, the image forming apparatus 100 includes a control panel 120 and an integrated circuit (IC) card reader 130. The control panel 120 includes a display 124 that supports a touch panel system. The image forming apparatus 100 receives an instruction or a selection made by a user via a graphical user interface (GUI) displayed on the display 124.

The image forming apparatus 100 includes, in addition to standard functions such as copying, faxing, or scanning, a document storage function of uploading scanned image data to the file server 300 via the network 50. The image forming apparatus 100 further includes a stored document printing function of downloading the image data stored in the file server 300 to form an image on a recording sheet according to the downloaded image data. As illustrated in FIG. 2, a main menu screen displayed on the display 124 includes virtual keys allows a user to select a desired function among those functions of the image forming apparatus 100. In addition, the main menu screen further includes a virtual key for the user registration.

The image forming apparatus 100 acquires information from an IC card via the IC card reader 130. The IC card reader 130 supports at least one of contact or contactless systems. In this exemplary embodiment, the user places his/her own Individual Number card over the IC card reader 130 to log in the image forming apparatus 100.

The IC chip contained in the Individual Number card stores an information set including the bearer's Individual Number and personal information such as a name, address, date of birth, and sex. Such information set is locked by a personal identification number (PIN).

A description has been given above of the configuration of the network printing system 1000 and the external view of the image forming apparatus 100. Hereinafter, a description is given of the functional configurations of the image forming apparatus 100, the user management server 200, the file server 300, and the charging server 400 with reference to a block diagram of FIG. 3.

The image forming apparatus 100 according to this exemplary embodiment includes a user information registration request unit 102, a login processing unit 103, a login history recording request unit 104, a service execution unit 106, and a charging execution unit 108.

The user information registration request unit 102 requests the user management server 200 to register the user information including user authentication information and user attribute information.

The login processing unit 103 requests the user management server 200 to perform the user authentication. The login processing unit 103 performs processing for logging in the image forming apparatus 100 based on a result of the user authentication.

The login history recording request unit 104 requests the user management server 200 to record a login history of the user logging in the image forming apparatus 100.

The service execution unit 106 executes a service selected by the user.

The charging execution unit 108 transmits, to the charging server 400, an amount of charges for services that the user has used while logging in the image forming apparatus 100.

Figure 14A:
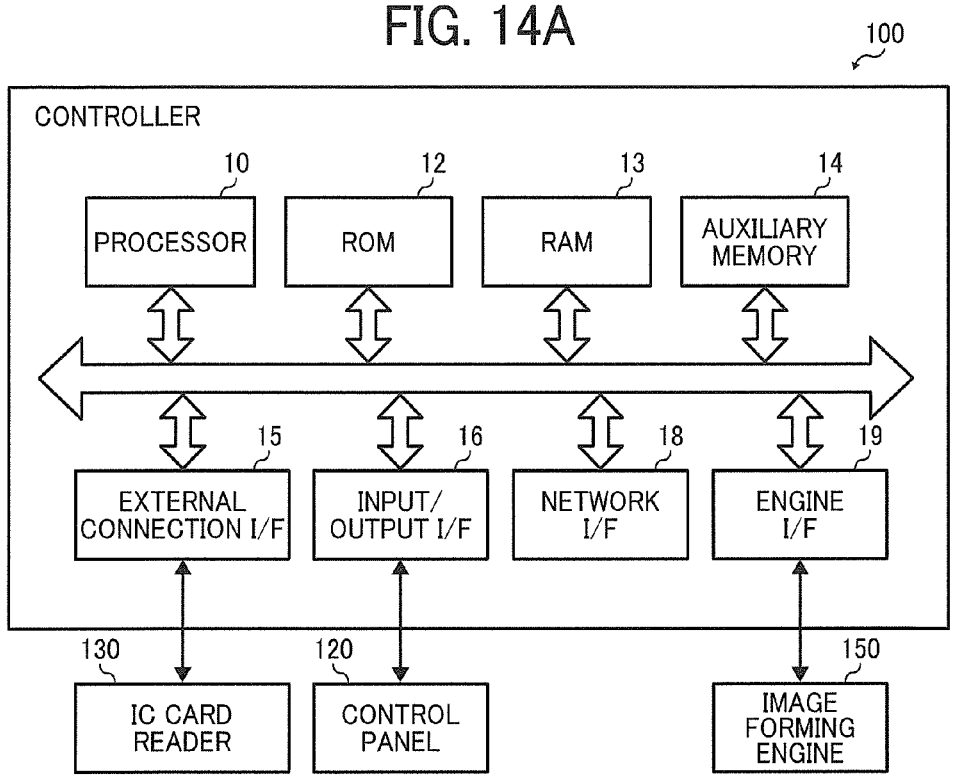
FIG. 14A is a block diagram illustrating a hardware configuration of the image forming apparatus of FIG. 1.

These units 102 to 108 are implemented by a dedicated application installed on a controller of the image forming apparatus 100, which operate in cooperation with hardware of the image forming apparatus 100 as illustrated in FIG. 14A.

The user management server 200 according to this exemplary embodiment includes a user information registration unit 202, a user authentication unit 204, a login history recording unit 206, and a database 208.

The user information registration unit 202 registers the user information in the database 208.

The user authentication unit 204 performs the user authentication in response to the request from the image following apparatus 100.

The login history recording unit 206 records, in the database 208, the login history of the user logging in the image forming apparatus 100 in response to the request from the image forming apparatus 100.

The charging server 400 according to this exemplary embodiment includes a charging history recording unit 402, a charging information providing unit 404, and a database 406.

The charging history recording unit 402 records, in the database 406, a charging history of services that user has used.

The charging information providing unit 404 provides the charging history of the user to the image forming apparatus 100 in response to a request from the image forming apparatus 100.

A description has been given above of the overview of the functional configurations of the image forming apparatus 100, the user management server 200, and the charging server 400 of the network printing system 1000. Hereinafter, a description is given of operations performed by one or more units of the image forming apparatus 100, the user management server 200, and the charging server 400. In the following description, FIG. 3 will also be referenced as necessary.

First, a description is given of operations performed by the image forming apparatus 100 and the user management server 200 for registering a user in a network printing service provided by the network printing system 1000 with reference to a sequence diagram of FIG. 4.

In response to an instruction for activation, the image forming apparatus 100 displays the main menu screen on the display 124 of the control panel 120. The image forming apparatus 100 receives the user selection of the user registration when the virtual key of "USER REGISTRATION" is touched on the main menu screen (S2). In response to this input from the user, the user information registration request unit 102 displays a screen for allowing the user to cause the IC card reader 130 to read the IC card (referred to as a "card reading screen" hereinafter) (S3).

Figure 5A:
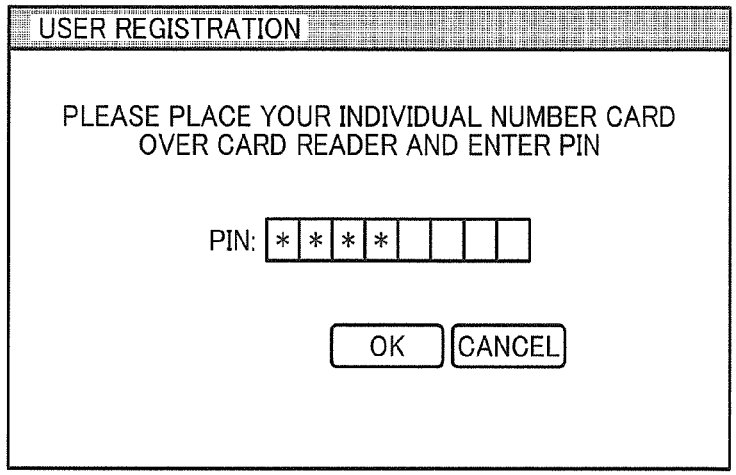
FIGS. 5A to 5C are views, each illustrating a user registration screen according to an exemplary embodiment of the present invention.

FIG. 5A illustrates an example of the card reading screen displayed at S3. As illustrated in FIG. 5A, the card reading screen includes a message, for example, "PLEASE PLACE YOUR INDIVIDUAL NUMBER CARD OVER CARD READER AND ENTER PIN".

Following the message displayed on the card reading screen, the user places his/her Individual Number card over the IC card reader (S4), and enters the PIN using a numeric keypad provided with the operation panel 120 (S5). In response to a virtual key "OK" being touched after S5, the user information registration request unit 102 unlocks the IC chip contained in the Individual Number card using the PIN that is input at S5 to read out an information set including the Individual Number and the personal information such as a name, address, date of birth, and sex from the IC chip via the IC card reader 130 (S6). The network printing system 1000 uses the Individual Number acquired at S6 as authentication information for logging in the image forming apparatus 100.

Subsequently, the user information registration request unit 102 displays, on the display 124, a screen for allowing the user to enter user information (referred to as a "user information input screen" hereinafter) (S7).

Figure 5B:
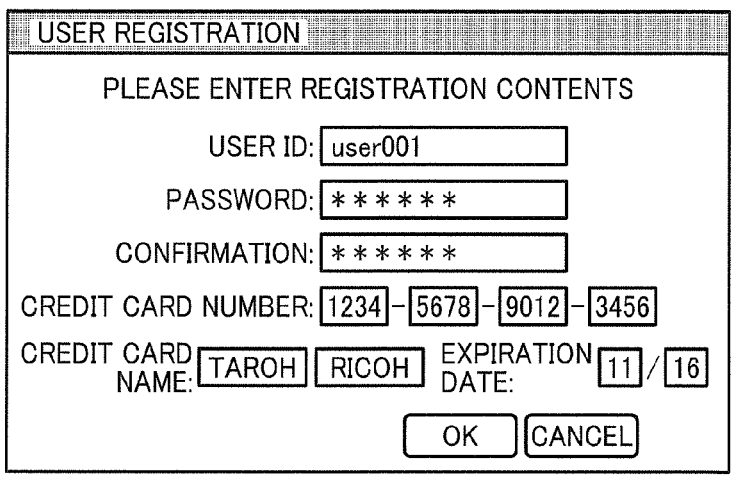

FIG. 5B illustrates an example of the user information input screen displayed at S7. As illustrated in FIG. 5B, the user information input screen displayed at S7 includes fields to enter the user ID and the password as well as fields to enter payment mode information. In this example, the payment mode information is credit card information.

As described above, in this exemplary embodiment, the user places his/her Individual Number card over the IC card reader 130 to log in the image forming apparatus 100. Further, in view of convenience to a user in a situation such as where the user does not carry the Individual Number card with him/her, the network printing system 1000 also allows the user to enter the authentication information, which is registered in advance, to log in the image forming apparatus 100. At S7, the user information registration request unit 102 accepts registration of the user ID and the password as the authentication information via the user information screen illustrated in FIG. 5B.

The user enters the user information including the user ID, the password, and the payment information in the fields on the user information input screen (S8). In response to the "OK" key being touched after S8, the user information registration request unit 102 acquires the user ID, the password, and the payment mode information (S9).

Subsequently, the user information registration request unit 102 displays, on the display 124, a screen for allowing the user to set the following conditions (referred to as a "condition setting screen" hereinafter) (S10).

Figure 5C:
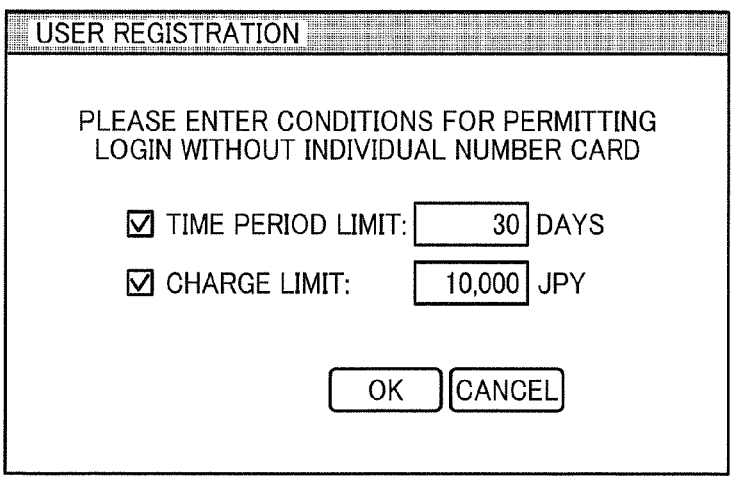

FIG. 5C illustrates an example of the condition setting screen displayed at S10. As illustrated in FIG. 5C, the condition setting screen includes a message "PLEASE ENTER CONDITIONS FOR PERMITTING LOGIN WITHOUT INDIVIDUAL NUMBER CARD", a field for entering a "charge limit", and a field for entering a "time period limit".

As described above, the network printing system 1000 according to this exemplary embodiment permits the login to the image forming apparatus 100 by the input of the user ID and the password in view of convenience to the user. However, in a place such as a convenience store where any number of people can come and go, there is a possibility that a malicious stranger steels the user ID and the user becomes a victim of identity fraud. In view of such situation, the image forming apparatus 100 according to this exemplary embodiment accepts the setting of conditions for permitting the user to use the image forming apparatus 100 without providing the Individual Number card via the condition setting screen as illustrated in FIG. 5C in order to suppress damage brought by the steel of the user ID and the password.

The conditions herein include a "time period condition" and a "charge condition". The "time period condition" indicates an upper limit of a time period during which the image forming apparatus 100 accepts the login without the Individual Number card. The "charge condition" indicates an upper limit of a total amount of charges for services that can be used continuously by the login without the Individual Number card.

The user enters desired values in the fields on the condition setting screen (S11). In response to the "OK" key being touched after S11, the user information registration request unit 102 acquires the value entered in the field of the "TIME PERIOD LIMIT" as the time period condition, and the value entered in the field of the "CHARGE LIMIT" as the charge condition (S12).

When a series of operations from S1 to S12 is completed, the user information registration request unit 102 generates a user information registration request including a set of the user information that is necessary for the user registration. The user information set includes the Individual Number, the personal information, the user ID, the password, the payment mode information, the time period condition, and the charge condition. The user information registration request unit 102 sends the generated user information registration request to the user management server 200 (S13). The user information registration unit 202 of the user management server 200 registers, in a user information management table 500, the user information set included in the user information registration request received from the image forming apparatus 100 (S14).

FIG. 6 illustrates an example of the user information management table 500 managed by the user management server 200. As illustrated in FIG. 6, the Individual Number, user ID, password, name, sex, address, date of birth, the payment mode information, the time period information, and the charge condition, which are included in the user information registration request received from the image forming apparatus 100 are stored respectively in fields 501 to 510 of the user information management table 500.

The user, who is registered in the network printing service provided by the network printing service 1000 via the operations from S1 to S14 as described above, is able to log in the image forming apparatus 100 managed by an entity, which affiliates the network printing service, with the Individual Number card, and to use the image forming apparatus 100 without cash.

Figure 7B:
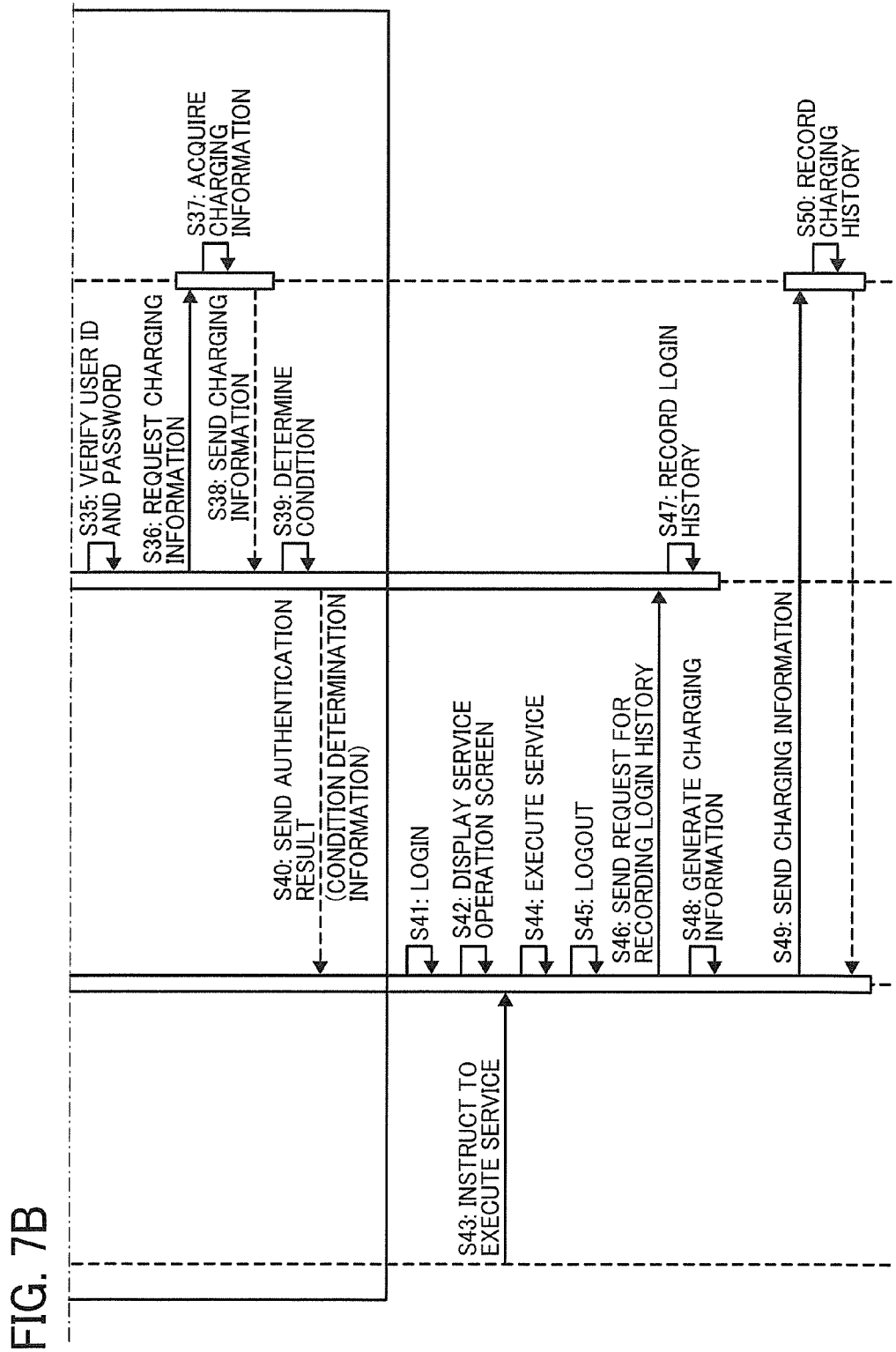

A description has been given above of the operations performed by the image aiming apparatus 100 and the user management server 200 for registering a user in the network printing service. Hereinafter, a description is given of operations performed by the network printing system 1000 when the registered user uses the network printing service with reference to sequence diagrams of FIGS. 7A and 7B.

Figure 8A:
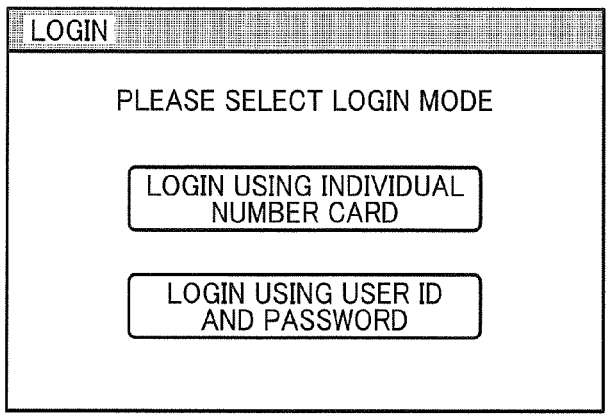
FIGS. 8A to 8C are views, each illustrating a login screen according to an exemplary embodiment of the present invention.

The user touches one of virtual keys of "COPY", "FAX", "PRINT", "STORE DOCUMENT", or "PRINT STORED DOCUMENT" on the main menu screen. That is, the image forming apparatus 100 receives the user selection of desired service (S21). In response to receiving the user selection, the login processing unit 103 of the image forming apparatus 100 displays, on the display 124, a screen that allows the user to select a desired login mode (referred to as a "login mode selection screen" hereinafter) (S22). FIG. 8A illustrates an example of the login mode selection screen displayed at S22. The login mode selection screen allows the user to select either a first login mode or a second login mode as a user authentication mode for a login operation. The first login mode uses the Individual Number card as the authentication information, while the second login mode uses the user ID and the password as the authentication information. In an example as illustrated in FIG. 8A, two virtual keys of "LOGIN USING INDIVIDUAL NUMBER CARD" and "LOGIN USING USER ID AND PASSWORD" are displayed to be selected.

Figure 8B:
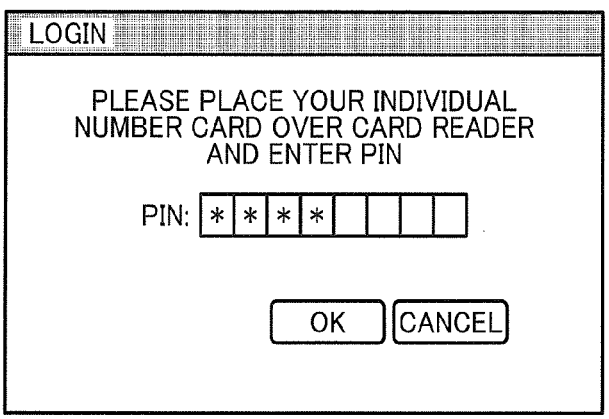

When the user select the virtual key of "LOGIN USING INDIVIDUAL NUMBER CARD" at S23, the login processing unit 103 displays, on the display 124, a card reading screen (S24). FIG. 8B illustrates an example of the card reading screen displayed at S24.

Following the message displayed on the card reading screen, the user places his/her Individual Number card over the IC card reader (S25), and enters the PIN (S26). In response to receiving this input from the user, the login processing unit 103 reads out the Individual Number from the IC chip contained in the Individual Number card using the PIN that is input at S25 (S27). Subsequently, the login processing unit 103 sends the authentication request including the Individual Number acquired at S27 as the authentication information to the user management server 200 (S28).

In response to receiving the authentication request from the login processing unit 103, the user authentication unit 204 of the user management server 200 verifies the Individual Number included in the authentication request against the value in the field 501 of the user information management table 500 (see FIG. 6) (S29). Further, the user authentication unit 204 sends the authentication result to the image forming apparatus 100 based on whether the verification has succeeded or failed at S29 (S30).

Figure 8C:
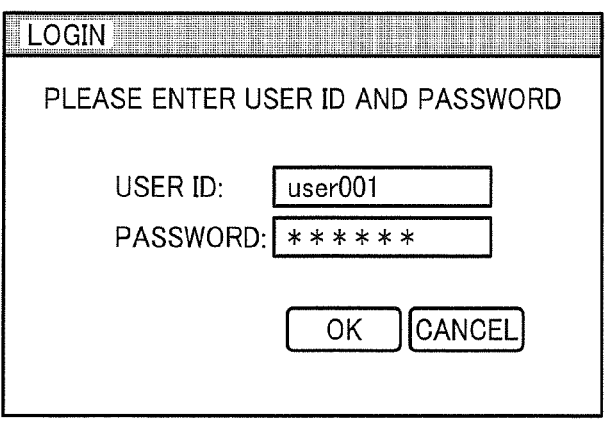

By contrast, when the user select the virtual key of "LOGIN USING USER ID AND PASSWORD" at S23, the login processing unit 103 displays, on the display 124, a screen that allows the user to enter login information (referred to as a "login information input screen" hereinafter) (S31). FIG. 8C illustrates an example of the login information input screen displayed at S31. As illustrated in FIG. 8C, the login information input screen displayed at S31 includes fields to enter the user ID and the password. On the login information input screen, the user enters the user ID and the password in the corresponding fields (S32).

In response to receiving this input from the user, the login processing unit 103 acquires the user ID and the password (S33). Further, the login processing unit 103 generates the authentication request including the acquired user ID and password as the authentication information, and sends the generated authentication request to the user management server 200 (S34).

In response to receiving the authentication request from the login processing unit 103, the user authentication unit 204 of the user management server 200 verifies the user ID and the password included in the authentication request against the values in the fields 502 and 503 respectively of the user information management table 500 (see FIG. 6) (S35). Further, the user authentication unit 204 requests the charging server 400 to send charging information of the user corresponding to the user ID included in the authentication request, as necessary (S36). In response to receiving the request from the user authentication unit 204, the charging server 400 acquires the charging information (described later) of the user (S37). Further, the charging server 400 sends the acquired charging information to the user management server 200 (S38).

The user authentication unit 204 of the user management server 200 makes a determination as to the time period condition and the charge condition that are set by the user corresponding to the user ID included in the authentication request based on the login history (described later) of the user and the charging information received from the charging server 400 (S39). Further, the user authentication unit 204 sends the authentication result based on a result of the determination at S39 and a result of the verification at S35 (S40). When the authentication unit 204 sends the authentication result indicating that the authentication has succeeded to the image forming apparatus 100 at S40, the authentication unit 204 sends not only the authentication result but also condition determination information (described later), which is used for determining the condition at S39.

The login processing unit 103 permits the login to the image forming apparatus 100 based on the authentication result received from the user management server 200 indicating that the authentication has succeeded (S41). In response to the permission issued from the login processing unit 103, the service execution unit 106 displays, on the display 124, a service operation screen of the service (either one of copy, fax, print, storing a document, or print a stored document) based on the user selection received at S21 (S42). The user performs a predetermined operation via the service operation screen to instruct execution of the service (S43). In response to this instruction from the user, the service execution unit 106 executes the instructed service (S44).

In response to detecting that the user finishes using the service, the service execution unit 106 performs a logout operation that causes the user to log out from the image forming apparatus 100 (S45). The login history recording request unit 104 generates login history recording request, which includes the individual identification information of the user who logs out from the image forming apparatus at S45, identification information that indicates the user authentication mode selected by the user at S23, and login date and time of the login operation. Further, the login history recording request unit 104 sends the generated login history recording request to the user management server 200 (S46). For example, when the user who logs in the image forming apparatus 100 using the Individual Number card logs out from the image forming apparatus, the login history recording request unit 104 generates the login history recording request that includes the "Individual Number" as the individual identification information and the identification information indicating the "user authentication using the Individual Number card" as the user authentication mode. By contrast, when the user who logs in the image forming apparatus using the user ID and the password, the login history recording request unit 104 generates the login history recording request that includes the "user ID" as the individual identification information and the identification information indicating the "login based on the user ID and the password" as the user authentication mode.

The login date and time to be included in the login history recording request may either be the date and time when the user is permitted to log in the image forming apparatus 100 at S41 or the date and time when the user logs out from the image forming apparatus 100 at S45.

The login history recording unit 206 of the user management server 200 records, in a login history list 600, the user's login history based on the individual identification information of the user, the login date and time, and the identification information indicating the user authentication mode, which are included in the login history recording request received from the image forming apparatus 100 (S47).

FIG. 9A illustrates an example of the login history list 600 managed by the login history recording unit 206. As illustrated in FIG. 9A, the login history list 600 stores the login date and time indicating when the user logs in the image forming apparatus 100, in association with the identification information indicating the user authentication mode used in the login operation. The login history list 600 is prepared for each user, and is associated with both Individual Number and the user ID of each user.

At S47, the login history recording unit 206 extracts the login history list 600 of the user who logs out from the image forming apparatus 100 based on the individual identification information included in the login history recording request. Specifically, when the individual identification information included in the login history recording request received from the image forming apparatus 100 is the "Individual Number", the login history recording unit 206 extracts the login history list 600 associated with the "Individual Number". By contrast, when the individual identification information included in the login history recording request received from the image forming apparatus 100 is the "user ID", the login history recording unit 206 extracts the login history list 600 associated with the "user ID. Subsequently, the login history recording unit 206 adds a new record in the extracted login history list 600. Further, the login history recording unit 206 stores, in the added new record, the login date and time in association with the identification information of the user authentication mode, which are included in the login history recording request.

Further, the charging execution unit 108 of the image forming apparatus 100 calculates a charge based on a type and amount of the service that the user who logs out from the image forming apparatus 100 at S25 has used during a login time period, in other words, while logging in the image forming apparatus 100. The charging execution unit 108 generates the charging information that includes the calculated charge, the individual identification information of the user (the Individual Number or the user ID), and the login date and time corresponding to the login time period (S48). Further, the charging execution unit 108 sends the generated charging information to the charging server 400 (S49). It is preferable that the login date and time to be included in the charging information may be the same date and time as the login date and time included in the login history recording request.

In response to receiving the charging information from the charging execution unit 108, the charging history recording unit 402 of the charging server 400 records, in a charging history list 700, the charging history of the user based on the individual identification information, the login date and time, and the charge included in the received charging information.

FIG. 9B illustrates an example of the charging history list 700 managed by the charging history recording unit 402. As illustrated in FIG. 9B, the charging history list 700 stores the login date and time indicating when the user logs in the image forming apparatus 100 in association with the charge for the service that the user has used during the login time period. The login history list 700 is prepared for each user, and is associated with both Individual Number and the user ID of each user.

At S50, the charging history recording unit 402 extracts the charging history list 700 of the user based on the individual identification information included in the charging information received from the image forming apparatus 100. Specifically, when the individual identification information included in the charging information is the "Individual Number", the charging history recording unit 402 extracts the charging history list 700 associated with the "Individual Number". By contrast, when the individual identification information included in the charging information is the "user ID", the charging history recording unit 402 extracts the charging history list 700 associated with the "user ID". Subsequently, the charging history recording unit 402 adds a new record in the extracted charging history list 700. Further, the charging history recording unit 402 stores, in the added new record, the login date and time in association with the charge, which are included in the charging information received from the image forming apparatus 100.

Figure 10:
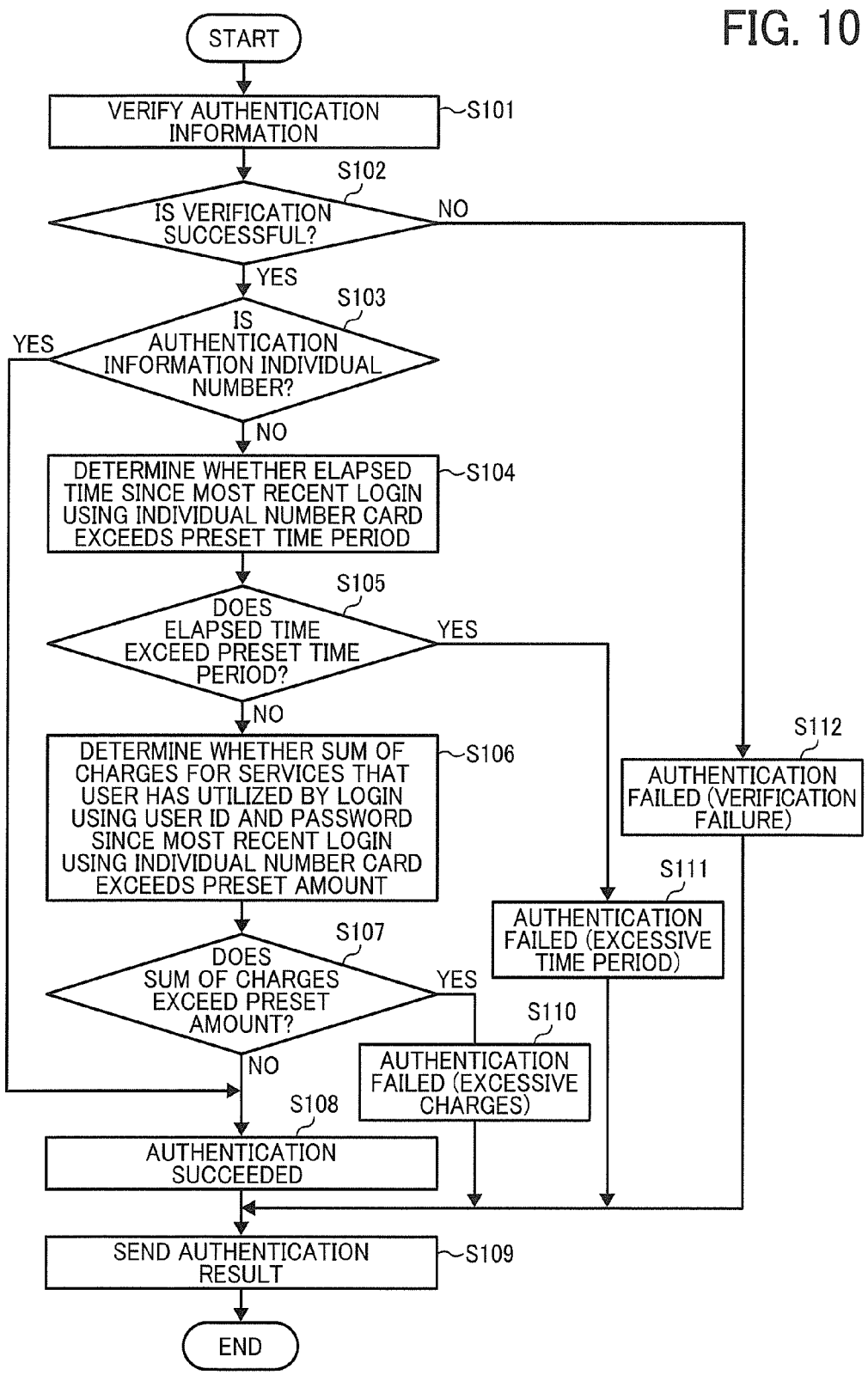
FIG. 10 is a flowchart illustrating an operation executed by a login processing unit of the image forming apparatus of FIG. 2.

A description has been given of operations performed by the network printing system 1000 when the registered user uses the network printing service. Hereinafter, a description is given of operations performed by the user authentication unit 204 of the user management server 200 with reference to a flowchart of FIG. 10.

At S101, the user authentication unit 204 verifies the authentication information (i.e., the Individual Number or the combination of the user ID and the password) included in the authentication request received from the image forming apparatus 100 against the values in the corresponding fields of the user information management table 500 (see FIG. 6). When the verification has failed (S102: NO), the user authentication fails (S112). Accordingly, the user authentication unit 204 sends the authentication result indicating that the authentication has failed to the image forming apparatus 100 that has requested the user authentication (S109). In this case, the authentication result sent to the image forming apparatus 100 at S109 describes a "verification failure" as a reason for the authentication failure.

When the verification of the authentication information has succeeded (S102: YES) and the authentication information included in the authentication request is the Individual Number (S103: YES), the user authentication succeeds (S108). Accordingly, the user authentication unit 204 sends the authentication result indicating that the user authentication has succeeded to the image forming apparatus 100 that has requested the user authentication (S109). Then, the operation ends.

By contrast, when the verification of the authentication information has succeeded (S102: YES) and the authentication information included in the authentication request is not the Individual Number (i.e, when the authentication information is the user ID and the password) (S103: NO), the operation proceeds to S104.

At S104, the user authentication unit 204 extracts the login history list 600 associated with the user ID included in the authentication request, and determines, with reference to the extracted login history list 600, whether the time period that has elapsed since the user corresponding to the user ID included in the authentication request most recently logged in the image forming apparatus 100 using the Individual Number card exceeds the preset time period. The preset time period herein corresponds to the time period condition set by the user via the condition setting screen (see FIG. 5C) in the user registration operation.

Specifically, the user authentication unit 204 specifies a record or records having the field of user authentication mode storing the identification information indicating the "user authentication using the Individual Number card" in the extracted login history list 600. Further, the user authentication 204 extracts the most recent login date and time among the dates and times stored in the fields of the login date and time of the specified records. In addition, the user authentication unit 204 calculates the elapsed time based on the difference between the extracted most recent login date and time and the current date and time, and determines whether the calculated elapsed time exceeds the preset time period.

In a case where the login history list 600 illustrated in FIG. 9A is referenced at S104, the user authentication unit 204 calculates the elapsed time based on the difference between the current date and time and the login date and time (i.e., 2015/03/01/21:00) stored in the record marked with a star. Then, the user authentication unit determines whether the calculated elapsed time exceeds the preset time period.

When the determination result indicates that the elapsed time exceeds the preset time period (S105: YES), the user authentication fails (S111). Accordingly, the user authentication unit 204 sends the authentication result indicating that the authentication has failed to the image forming apparatus 100 that has requested the authentication (S109). In this case, the authentication result sent to the image forming apparatus 100 at S109 describes an "excess of time period" as a reason for the authentication failure. By contrast, when the determination result indicates that the elapsed time does not exceed the preset time period (S105: NO), the operation proceeds to S106.

At S106, the user authentication unit 204 determines whether the sum of charges for services that the user corresponding to the user ID included in the authentication request has used during the login time periods using the user ID and the password after the most recent login using the Individual Number card exceeds a preset amount.

Specifically, the user authentication unit 204 sends, to the charging server 400, a charging information request including information requesting the login date and time (the login date and time using the Individual Number card) that is extracted at S104 and the charging information after the extracted login date and time (see FIG. 7: S36). In response to receiving the charging information request from the user authentication unit 204, the charging information providing unit 404 of the charging server 400 extracts the charging history list 700 associated with the user ID included in the received authentication request. Further, the charging information providing unit 404 acquires, as the charging information, a record or records having the field of login date and time storing date and time later than the login date and time included in the authentication request in the extracted charging history list 700 (see FIG. 7: S37). Furthermore, the charging information providing unit 404 sends the acquired charging information to the image forming apparatus 100 (see FIG. 7: S38).

In a case where the charging history list 700 illustrated in FIG. 9B is referenced at S104 and the login date and time included in the authentication request received from the user authentication unit 204 is "2015/03/01/21:00", the charging information providing unit 404 sends, to the image forming apparatus 100, the records, which are marked with a star, each storing the date and time later than the login date and time of "2015/03/01/21:00" as the charging information.

The user authentication unit 204 sums up the charges stored in the records included in the charging information received from the charging server 400 to determine whether the sum exceeds the preset amount. The preset amount herein corresponds to the charge condition set by the user via the condition setting screen (see FIG. 5C) in the user registration operation.

When the determination result indicates that the sum of the charges exceeds the preset amount (S107: YES), the user authentication fails (S110). Accordingly, the user authentication unit 204 sends the authentication result indicating that the authentication has failed to the image forming apparatus 100 that has requested the authentication (S109). In this case, the authentication result sent to the image forming apparatus 100 at S109 describes an "excess of charges" as a reason for the authentication failure. By contrast, when the determination result indicates that the sum of the charges does not exceed the preset amount (S107: NO), the user authentication succeeds (S108). Accordingly, the user authentication unit 204 sends the authentication result indicating that the authentication has succeeded to the image forming apparatus 100 that has requested the authentication (S109). Then, the operation ends.

Figure 11:
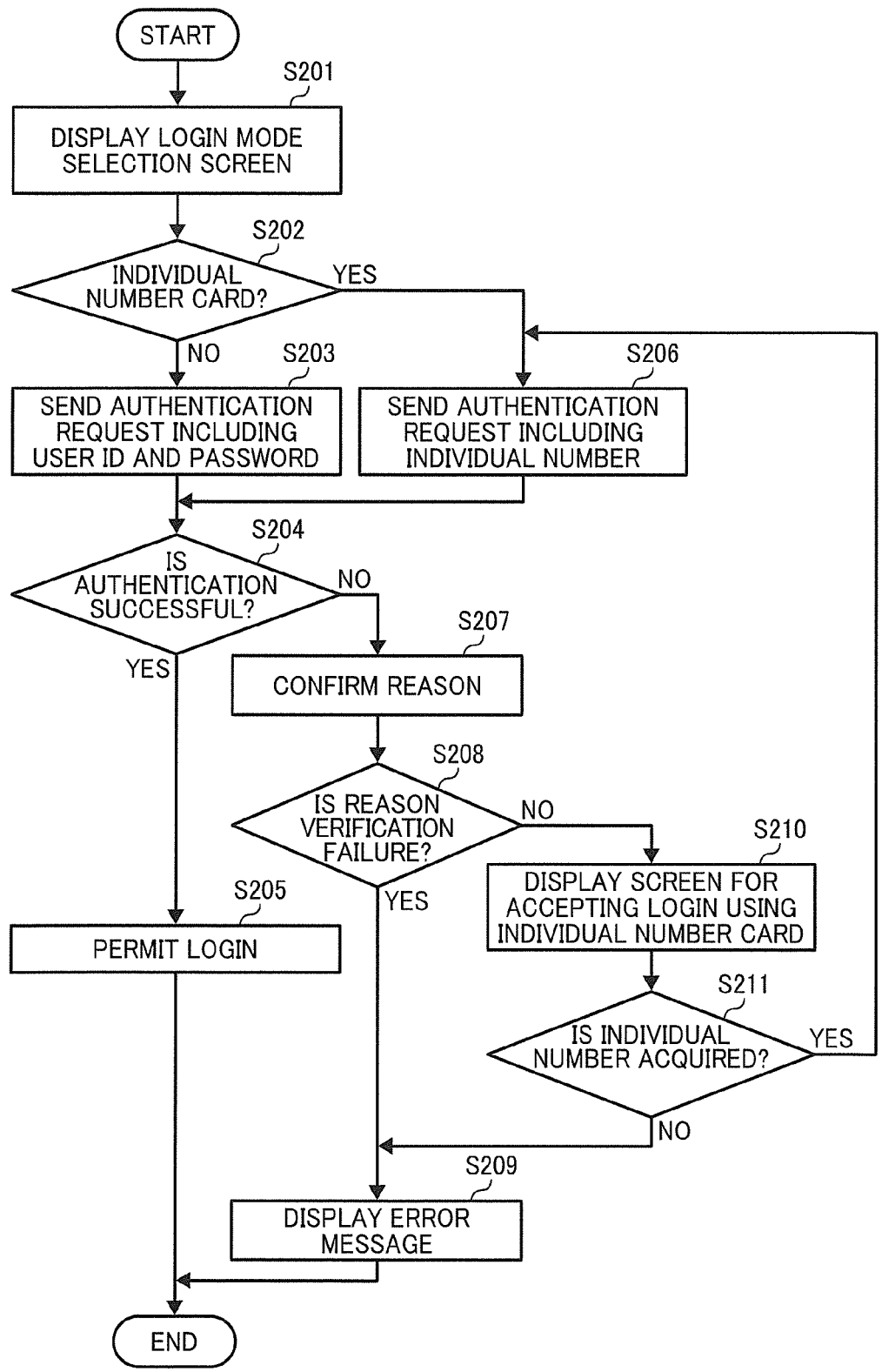
FIG. 11 is a flowchart illustrating an operation executed by a user authentication unit of a user management server of the network printing system of FIG. 1.

A description has been given of operations performed by the user authentication unit 204 of the user management server 200. Hereinafter, a description is given of a login operation performed by the login processing unit 103 of the image forming apparatus 100 with reference to a flowchart of FIG. 11.

At S201, the login processing unit 103 displays, on the display 124, the login mode selection screen as illustrated in FIG. 8A. When the login processing unit 103 receives the user selection of the user authentication using the Individual Number card on the login mode selection screen (S202: YES), the login processing unit 103 sends, to the user management server 200, the authentication request including the Individual Number as the authentication information, the Individual Number being acquired via the IC card reader 130 (S206). In response to receiving the authentication result indicating the authentication has succeeded from the user management server 200 (S204: YES), the login processing unit 103 permits the user to log in the image forming apparatus 100 (S205). Then, the login processing unit 103 causes the image forming apparatus 100 to transition to a state where the service provided by the image forming apparatus 100 is available, and the operation ends.

By contrast, in response to receiving the user selection of the user authentication using the user ID and the password (S202: NO), the login processing unit 103 sends, to the user management server 200, the authentication request including the user ID and the password as the authentication information, the user ID and the password being acquired via the login information input screen as illustrated in FIG. 8C. In response to receiving the authentication result indicating the authentication has succeeded from the user management server 200 (S204: YES), the login processing unit 103 permits the user to log in the image forming apparatus 100 (S205). Then, the login processing unit 103 causes the image forming apparatus 100 to transition to a state where the service provided by the image forming apparatus 100 is available, and the operation ends.

By contrast, in response to receiving the authentication result indicating that the authentication has failed (S204: NO), the login processing unit 103 confirms the reason for the authentication failure, which is included in the authentication result. In a case where the reason is the "verification failure" (S208: YES), the login processing unit 103 displays, on the display 124, a message such as "LOGIN IS DENIED" (S209), and the operation ends. In a case where the reason for the authentication failure is a reason other than the "verification failure", that is, the excess of time period or the excess of charges (S208: NO), the operation proceeds to S210.

Figure 12A:
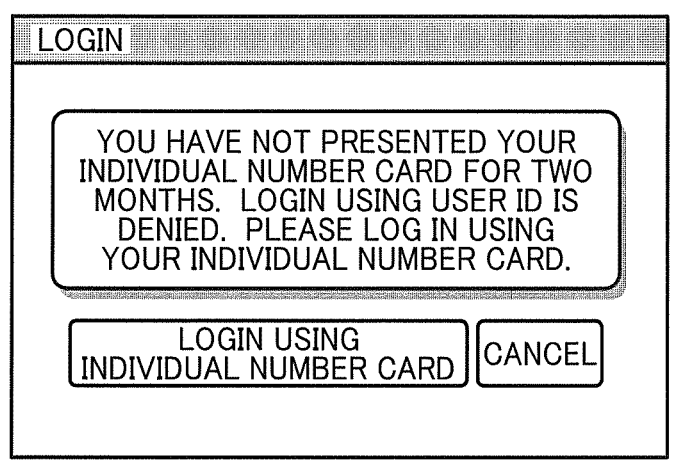
FIGS. 12A and 12B are views, each illustrating a login screen according to an exemplary embodiment of the present invention.
Figure 12B:
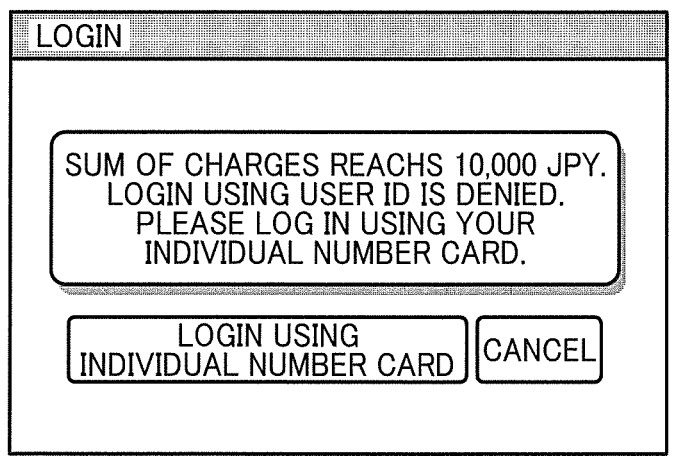

At S210, the login processing unit 103 displays, on the display 124, an acceptance screen for accepting the user authentication using the Individual Number card. The acceptance unit includes a message indicating the reason for the authentication failure and a virtual key of "LOGIN USING INDIVIDUAL NUMBER CARD". FIG. 12A illustrates an example of the acceptance screen displayed when the reason for the authentication failure is the "excess of time period". FIG. 12B illustrates an example of the acceptance screen displayed when the reason for the authentication failure is the "excess of charges".

The user touches the virtual key of "LOGIN USING INDIVIDUAL NUMBER CARD" on the acceptance screen and places the Individual Number card over the IC card reader 130. In response to receiving this input from the user, the login processing unit 103 acquires the Individual Number from the Individual Number card (S211: YES). Then, the login processing unit 103 sends, to the user management server 200, the authentication request including the acquired Individual Number as the authentication information (S206). In response to receiving the authentication result indicating the authentication has succeeded (S204: YES) from the user management server 200, the login processing unit 103 permits the user to log in the image forming apparatus 100 (S205). Then, the login processing unit 103 causes the image forming apparatus 100 to transition to a state where the service provided by the image forming apparatus 100 is available, and the operation ends.

By contrast, in a case where the virtual key of "CANCEL" is touched on the acceptance screen or in a case where the Individual Number card is not placed over the IC card reader 130, the login processing unit does not acquire the Individual Number from the Individual Number card (S211: NO). Then, the login processing unit 103 displays a message such as "LOGIN IS DENIED" on the display 124 (S209), and the operation ends.

A description has been given of the login operation performed by the login processing unit 103 of the image forming apparatus 100. Hereinafter a description is given of operations performed by the login processing unit 103 during the execution of the service. As described above with reference to FIG. 7, the user authentication unit 204 of the user management server 200 sends, to the image forming apparatus 100, the authentication result indicating that the authentication has succeeded together with the condition determination information, which the user authentication unit 204 uses for making the decision as to the time period condition and the charge condition (see FIG. 7: S40) Specifically, the condition determination information is an information set including the conditions that are set by the user (i.e., the time period condition and the charge condition), the login date and time when the user most recently logs in the image forming apparatus 100 using the Individual Number card, and the sum of charges for services used by the user while logging in the image forming apparatus 100 using the user ID and the password after the user most recently logs in the image forming apparatus 100 using the Individual Number card.

The login processing unit 103 temporarily stores, in a memory such as a random access memory (RAM) 13 of FIG. 14A, the "time period condition", the "charge condition", the "login date and time", and the difference between the "charge condition" and the "sum of charges" (referred to as a "charge difference"), and then performs operations as illustrated in a flowchart of FIG. 13 after the execution of the service is started.

The login processing unit 103 determines whether the elapsed time, which is obtained based on the difference between the temporarily stored "login date and time" and the current date and time, exceeds the "time period condition" (S301). Further, the login processing unit 103 determines whether the sum of charges, which is obtained by adding the charge that is sequentially calculated by the charging execution unit 108 to the temporarily stored "sum of charges", exceeds the "charge condition". The login processing unit 103 repeats this determination operation until the service ends (S301, S302, S309: NO). When the service ends (S309: YES), the login processing unit 103 performs a user logout operation (S310), and the operation ends.

In a case where the determination result indicates that the elapsed time exceeds the "time period condition" during the execution of service (S301: YES), or in a case where the determination result indicates that the sum of charges exceeds the "charge condition" during the execution of service (S302: YES), the login processing unit 103 stops the service in execution, and performs the user logout operation (S303).

At S304, the login processing unit 103 displays, on the display 124, the acceptance screen as illustrated in FIG. 12A or FIG. 12B. For instance, in a case where the login processing unit 103 determines, at S301, that the elapsed time exceeds the "time period condition" during the execution of service, the login processing unit 103 displays the acceptance screen as illustrated in FIG. 12A at S304. Alternatively, in a case where the login processing unit 103 determines, at S301, that the sum of charges exceeds the "charge condition" during the execution of service, the login processing unit 103 displays the acceptance screen as illustrated in FIG. 12B at S304.

The user touches the virtual key of "LOGIN USING INDIVIDUAL NUMBER CARD" on the acceptance screen displayed at S305 and places the Individual Number card over the IC card reader 130. In response to receiving this input from the user, the login processing unit 103 acquires the Individual Number from the Individual Number card (S305: YES). Then, the login processing unit 103 sends, to the user management server 200, the authentication request including the acquired Individual Number as the authentication information (S306). In response to receiving the authentication result indicating the authentication has succeeded from the user management server 200 (S307: YES), the login processing unit 103 permits the user to log in the image forming apparatus 100 (S308). Then, the login processing unit 103 restarts the execution of service that has been in a stop condition. When the execution of service ends (S309: YES), the login processing unit 103 performs a user logout operation, and the operation ends.

By contrast, in a case where the virtual key of "CANCEL" is touched on the acceptance screen or in a case where the Individual Number card is not placed over the IC card reader 130, the login processing unit does not acquire the Individual Number from the Individual Number card (S305: NO). Then, the login processing unit 103 displays a message such as "LOGIN IS DENIED" on the display 124 (S311), and the operation ends.

As described heretofore, according to this exemplary embodiment, a user has only to place the Individual Number card over the IC card reader 130 to use the image forming apparatus 100 without cash.

Further, according to this exemplary embodiment, the user can login the image forming apparatus 100 using the user ID and the password that are registered in advance even when the user does not carry the Individual Number card with him/her. Furthermore, according to this exemplary embodiment, in a case where the time period during which the Individual Number card has not been presented exceeds the predetermined time period, or in a case where the amount of charges for services used while the user logs in the image forming apparatus 100 with the user ID and the password exceeds the predetermined amount, the image forming apparatus 100 transitions to a state where the image forming apparatus 100 does not accept the login using the user ID and the password. Accordingly, damage brought by identity fraud can be suppressed even when the user ID and the password are stolen.

Still further, according to this exemplary embodiment, in a case where the time period during which the Individual Number card has not been presented exceeds the predetermined time period during the execution of service after the login operation, or in a case where the amount of charges for services used while the user logs in the image forming apparatus 100 with the user ID and the password exceeds the predetermined amount during the execution of service after the login operation, the execution of service is stopped. Accordingly, damage brought by identity fraud can be suppressed. Thus, according to this exemplary embodiment, security of authentication is enhanced in an information processing apparatus that accepts a plurality of pieces of user authentication information.

A description has been given above of the exemplary embodiment where the Individual Number card is used in the user authentication operation for logging in the image forming apparatus 100. However, the IC card used for the user authentication is not limited to the Individual Number card. Any other existing IC cards such as the Basic Resident Registration card and an IC driver's license may be used for the user authentication according to this exemplary embodiment. Further, the information processing apparatus according to this exemplary embodiment is not limited to the image forming apparatus. The information processing apparatus according to this exemplary embodiment may include any information processing apparatus as long as the image forming apparatus requires a user authentication operation for login.

The user authentication using the existing IC cards is advantageous because no cost is incurred by the issuance and/or maintenance of a dedicated IC card (entities that issue the dedicated card bear such cost). ID cards issued by administrative offices such as the Individual Number card, the Basic Resident Registration card, and an IC driver's license are distributed widely to the public. Therefore, such IC cards provide advantages when used for the user authentication of various information processing apparatuses that are supposed to be made available in public.

Hereinafter, a description is given of hardware configurations of the image forming apparatus 100, the user management server 200, a file server 300, and the charging server 400 with reference to FIGS. 14A and 14B.

As illustrated in FIG. 14A, the image forming apparatus 100 includes a controller (computer). The controller includes a processor 10, a read only memory (ROM) 12, a random access memory (RAM) 13, an auxiliary memory 14, an external connection interface 15, an input/output interface 16, a network interface 18, and an engine interface 19. The processor 10, which is a central processing unit (CPU), controls entire operation of the image forming apparatus 100. The ROM 12 stores a boot program or a firmware program. The RAM 13 provides a work area for executing the program loaded from the ROM 12. The auxiliary memory 14 stores an operating system (OS) or applications. The external connection interface 15 is an interface for connecting the controller with an external input/output device such as the IC card reader 130. The input/output interface 16 is an interface for connecting the controller with, for example, the control panel 120. In this example, the input/output interface 16 is a user interface that interacts with a user. The network interface 18 is an interface for connecting the controller with the network 50, such as a network interface circuit. The engine interface 19 is an interface for connecting the controller with an image forming engine 150, which forms an image on a recording sheet. The image forming engine corresponds to various hardware to print an image, such as a photoconductor, exposure device, charger, developer, cleaning device, fixing device, etc.

In the exemplary embodiment, the processor 10 executes the dedicated program stored in the ROM 12 using the work area provided by the RAM 13 to implement to implement the user information registration request unit 102, the login processing unit 103, the login history recording request unit 104, the service execution unit 106, and the charging execution unit 108.

Figure 14B:
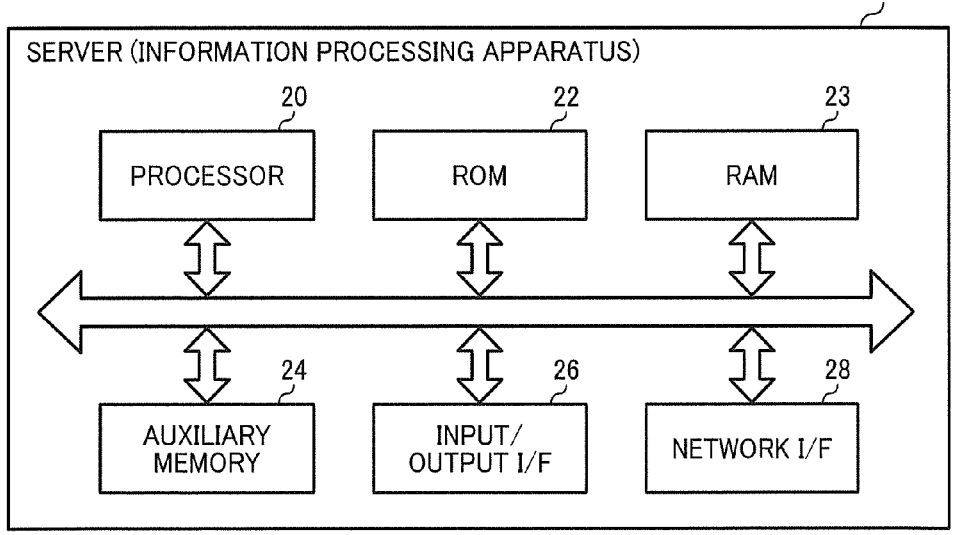
FIG. 14B is a block diagram illustrating a hardware configuration of the servers of the network printing system of FIG. 1.

As illustrated in FIG. 14B, a computer constituting each of the user management server 200, the file server 300, and the charging server 400 includes a processor 20, a ROM 22, a RAM 23, an auxiliary memory 24, an input/output interface 26, and a network interface 28. The processor 20 controls entire operation of the user management server 200, the file server 300, or the charging server 400. The ROM 22 stores a boot program or a firmware program. The RAM 23 provides a work area for executing a program loaded from the ROM 22. The auxiliary memory 24 stores an operating system (OS) or applications. The input/output interface 26 is an interface for connecting the user management server 200, the file server 300, or the charging server 400 with a control panel or a display. The network interface 28 is an interface for connecting the user management server 200, the file server 300, or the charging server 400 with the network 50.

Figure 3:
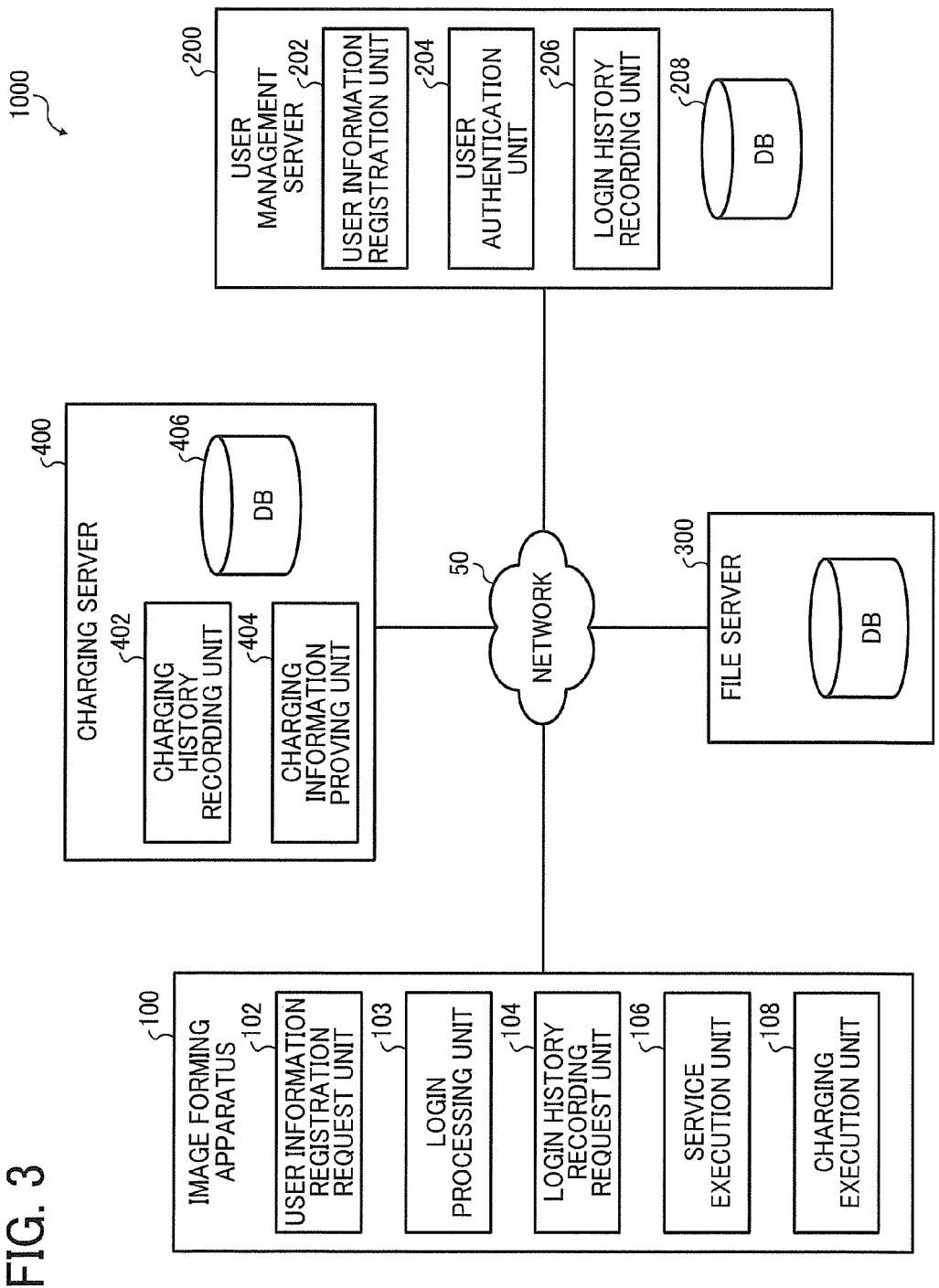
FIG. 3 is a block diagram illustrating a functional configuration of the image forming apparatus and servers constituting the network printing system of FIG. 1.

In the exemplary embodiment, the processor 20 executes the dedicated program stored in the ROM 22 using the work area provided by the RAM 23 to implement process of each unit illustrated in FIG. 3. In other words, the processor 20 of the user management server 200 executes the dedicated program using the RAM 23 as the work area to implement the user information registration unit 202, the user authentication unit 204, the login history recording unit 206, and the database 208. Further, the processor 20 of the charging server 400 executes the dedicated program using the RAM 23 as the work area to implement the charging history recording unit 402, the charging information providing unit 404, and the database 406.

Each function in the exemplary embodiment may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, the network can comprise any conventional terrestrial or wireless communications network, such as the Internet.

What is claimed is:

1. An information processing system comprising:
at least one information processing terminal; and
a first information processing apparatus connected to the at least one information processing terminal via a network,
the information processing terminal including:
a user interface to receive, from a user, an instruction for selecting a user authentication mode from among at least a first user authentication mode and a second user authentication mode, the first user authentication mode using individual authentication information stored in an IC card as user authentication information, and the second user authentication mode using a user ID and a password input from the user as the user authentication information; and
circuitry to:
in response to the instruction from the user for selecting the first user authentication mode, acquire the individual authentication information from the IC card, and send a user authentication request including the individual authentication information acquired from the IC card to the first information processing apparatus;
in response to the instruction from the user for selecting the second user authentication mode, acquire the user ID and the password input from the user and send the user authentication request including the user ID and the password to the first information processing apparatus; and
send, to the first information processing apparatus, a login history recording request when the user is an authenticated user who is permitted to log in the information processing terminal, the login history recording request including information indicating the selected user authentication mode selected by the authenticated user and login date and time of the authenticated user; and
the first information processing apparatus including:
a memory to store a login history that associates the selected user authentication mode with the login date and time of the authenticated user, which are included in the login history recording request received from the information processing terminal; and circuitry to authenticate the user based on the authentication information included in the user authentication request received from the information processing terminal, wherein, when the instruction for selecting selects the second user authentication mode, the circuitry of the first information processing apparatus is further configured to determine whether a sum of charges for services used by the user while logging in the information processing terminal via the second user authentication mode after a most recent login via the first user authentication mode exceeds a predetermined amount, and generate an authentication result indicating that the user is not the authenticated user.

2. The information processing system according to claim 1, wherein the circuitry of the information processing terminal performs a user logout operation when the sum of charges for services used by the user while logging in the information processing terminal via the second user authentication mode after the most recent login via the first user authentication mode exceeds the predetermined amount, and permits the user who is subjected to the user logout operation to log in the information processing terminal only via the first user authentication mode after the user logout operation.

3. The information processing system according to claim 1, further comprising a second information processing apparatus connected to the information processing terminal and the first information processing apparatus via the network, wherein the circuitry of the information processing terminal further sends, to the second information processing apparatus, an amount of charges for the service used by the user while logging in the information processing terminal, and wherein, when the user selects the second user authentication mode for logging in the information processing terminal, the circuitry of the first information processing apparatus acquires, from the second information processing apparatus, the amount of charge for the service used by the user while logging in the information processing terminal via the second user authentication mode after the most recent login via the first user authentication mode.

4. The information processing system according to claim 1, wherein, when the user selects the second user authentication mode for logging in the information processing terminal, the circuitry of the first information processing apparatus is further configured to determine whether a time period that has elapsed since the most recent login via the first user authentication mode exceeds a predetermined time period, and generate the authentication result indicating that the user is not authenticated when the time period that has elapsed since the most recent login via the first user authentication mode exceeds the predetermined time period.

5. The information processing system according to claim 4, wherein the circuitry of the information processing terminal performs a user logout operation when the time period that has elapsed since the most recent login via the first user authentication mode exceeds a predetermined time period, and permits the user who is subjected to the user logout operation to log in the information processing terminal only via the first user authentication mode after the user logout operation.

6. The information processing system according to claim 1, wherein the information processing terminal is an image forming apparatus.

7. The information processing system according to claim 1, wherein the IC card is an identification card issued by an administrative office.

8. The information processing system according to claim 7, wherein the identification card stores an information set including a number that is specific to the user and the user's personal information, and wherein the individual authentication information is the number specific to the user stored in the identification card.

9. A method for authenticating a user, comprising:

receiving a user authentication request for authenticating a user from an information processing terminal through a network, the user authentication request including individual authentication information acquired from an IC card of the user as authentication information, when the instruction for selecting selects a first user authentication mode, and the user authentication request including a user ID and a password input from the user as the authentication information, when the instruction for selecting selects a second user authentication mode;

authenticating the user based on the authentication information included in the user authentication request;

receiving a login history recording request from the information processing terminal, the login history recording request including information indicating the selected user authentication mode selected by the user, and login date and time of the user;

storing, in a memory, a login history that associates the selected user authentication mode with the login date and time, which are included in the login history recording request received from the information processing terminal; and wherein, when the instruction for selecting selects the second user authentication mode, the step of authenticating includes determining whether a sum of charges for services used by the user while logging in the information processing terminal via the second user authentication mode after a most recent login via the first user authentication mode exceeds a predetermined amount; and generating an authentication result indicating that the user is not the authenticated user when the determining determines that the sum of charges exceeds the predetermined amount.

10. The method according to claim 9, wherein, when the instruction for selecting selects the second user authentication mode, the step of determining further includes:

determining whether a time period that has elapsed since the most recent login via the first user authentication mode exceeds a predetermined time period; and generating the authentication result indicating that the user is not the authenticated user when the determining determines that the elapsed time period exceeds the predetermined time period.

11. An information processing apparatus, comprising:
a network interface to receive a user authentication request for authenticating a user from an information processing terminal through a network,
  the user authentication request including individual authentication information acquired from an IC card of the user as authentication information, when the instruction for selecting selects a first user authentication mode, and
  the user authentication request including a user ID and a password input from the user as the authentication information, when the instruction for selecting selects a second user authentication mode; and
a circuitry to:
  authenticate the user based on the authentication information included in the user authentication request,
  receive a login history recording request from the information processing terminal, the login history recording request including information indicating the selected user authentication mode selected by the user, and login date and time of the user;
  store, in a memory, a login history that associates the selected user authentication mode with the login date and time, which are included in the login history recording request received from the information processing terminal,
wherein, when the instruction for selecting selects the second user authentication mode, the circuitry determines whether a sum of charges for services used by the user while logging in the information processing terminal via the second user authentication mode after a most recent login via the first user authentication mode exceeds a predetermined amount, and generates an authentication result indicating that the user is not the authenticated user when the sum of charges exceeds the predetermined amount.

* * * * *